(12) United States Patent
Mun et al.

(10) Patent No.: US 7,362,484 B2
(45) Date of Patent: Apr. 22, 2008

(54) OPTICAL SCANNER PACKAGE WITH OPTICAL NOISE REDUCTION

(75) Inventors: Yong-kweun Mun, Yongin-si (KR); Won-kyoung Choi, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/357,220

(22) Filed: Feb. 21, 2006

(65) Prior Publication Data
US 2007/0008601 A1    Jan. 11, 2007

(30) Foreign Application Priority Data
Jul. 9, 2005    (KR)    ........... 10-2005-0061947

(51) Int. Cl.
G02B 26/08    (2006.01)
G02B 5/08    (2006.01)

(52) U.S. Cl. .................... 359/197; 359/857
(58) Field of Classification Search ........... 359/834, 359/850, 857, 196–226; 257/431–434
See application file for complete search history.

(56) References Cited

U.S. PATENT DOCUMENTS

| 5,742,419 A * | 4/1998 | Dickensheets et al. ...... 359/201 |
| 5,966,230 A * | 10/1999 | Swartz et al. .............. 359/196 |
| 6,078,419 A * | 6/2000 | Atsuumi ...................... 359/207 |
| 6,295,154 B1 * | 9/2001 | Laor et al. .................. 359/223 |
| 2003/0043157 A1 * | 3/2003 | Miles .......................... 345/540 |
| 2005/0117235 A1 | 6/2005 | Ko et al. |
| 2006/0082250 A1 | 4/2006 | Ko et al. |

FOREIGN PATENT DOCUMENTS

| KR | 1020040035116 A | 4/2004 |
| KR | 1020050053053 A | 6/2005 |

OTHER PUBLICATIONS

Official Action issued by the Patent Office of the Peoples' Republic of China in corres. CN Patent Application No. 2006 100088431; Aug. 3, 2007; and English-language translation thereof.

* cited by examiner

Primary Examiner—Stephone B. Allen
Assistant Examiner—Jennifer L Doak
(74) Attorney, Agent, or Firm—Buchanan Ingersoll & Rooney PC

(57) ABSTRACT

The optical scanner package having: an optical scanner device scanning an incident beam and including a scanning mirror and a comb-electrode structure operating the scanning mirror; a package container containing the optical scanner device; and a package window that is formed on the package container to hermetically seal the package container, and includes a reflection mirror which reflects the scanned beam from the optical scanner device to a screen unit on one side, thus separating the path of the scanned beam from the path of a noise beam derived from the incident beam.

31 Claims, 5 Drawing Sheets

OPTICAL SCANNER PACKAGE WITH OPTICAL NOISE REDUCTION

CROSS-REFERENCE TO RELATED PATENT APPLICATION

Priority is claimed to Korean Patent Application No. 10-2005-0061947, filed on Jul. 9, 2005, in the Korean Intellectual Property Office, the disclosure of which is incorporated herein in its entirety by reference.

BACKGROUND OF THE DISCLOSURE

1. Field of the Disclosure

The present disclosure relates to an optical scanner package, and more in particular, to an optical scanner package with an improved structure to reduce noise in realized images.

2. Description of the Related Art

Appliances such as projection televisions include an optical scanner device with a micro electromechanical systems (MEMS) structure that inclines a laser beam through an electrostatic effect caused by a comb-type electrode. However, the mirrors of such optical scanner devices are very small, i.e., of the order of several millimeters or less, and thus very sensitive to external conditions. Therefore, to maintain the characteristics of an optical scanner device and protect the optical scanner device, a hermetically sealed package is needed.

FIG. 1 is a cross-sectional view of a conventional optical scanner package. Referring to FIG. 1, the conventional optical scanner package includes an optical scanner device 10, a package container 20 containing the optical scanner 10, and a package window 30 which hermetically seals the package container 20 and protects the optical scanner device 10 from external conditions. The optical scanner device 10 includes a scanning mirror 12 scanning an incident beam and a comb-type electrode 14 operating the scanning mirror 12. By scanning the incident beam using an external electric source, the optical scanner device 10 realizes an image on a screen unit S. The manufacturing process of the optical scanning package includes diebonding the optical scanner device 10 in the package container 20, applying an external electric source to the optical scanner device 10 and hermetically sealing the optical scanner device 10 from the outside by bonding the package window 30 to the package container 20. An optical scanner device structure and a manufacturing method thereof are disclosed in Korean Patent Publication No. 2004-35116, Korean Patent Publication No. 20050053053, and Korean Patent Application No. 2004-83537 (correspond to U.S. patent application Publication No. 2006/0082250), which are incorporated herein by reference.

However, in a conventional optical scanner device, when an incident beam is transmitted to the package window 30 and reaches the optical scanner device, the incident beam is reflected on the surface of the package window 30 and thus a noise beam is generated. The noise beam generates undesired images on the screen unit S.

SUMMARY OF THE DISCLOSURE

The present disclosure provides an optical scanner package for an optical scanner reducing noise in a realized image.

According to an aspect of the present invention, there is provided an optical scanner package comprise: an optical scanner device scanning an incident beam and including a scanning mirror and a comb-electrode structure operating the scanning mirror; a package container containing the optical scanner device; and a package window that is formed on the package container to hermetically seal the package container, and includes a reflection mirror which reflects the scanned beam from the optical scanner device to a screen unit on one side, thus separating the path of the scanned beam from the path of a noise beam derived from the incident beam.

Preferably, the package window may be formed of a light-transmissive material and the reflection mirror is coated with a light-reflective material such as Ag, Al, and Au.

Preferably, the package window may include: first and second light-transmissive surfaces through which an incident beam transmitted to the optical scanner device is sequentially transmitted, a third light-transmissive surface on which the reflection mirror is formed, and a fourth light-transmissive surface through which a scanned beam reflected from the reflection mirror to the screen unit is transmitted. The vertical cross-section of the package window may form an asymmetric trapezoid. The optical scanner package may further include a high reflection coating film formed of a transparent dielectric material such as $TiO_2$, $Ta_2O_5$, and $SiO_2$ on the reflection mirror. The optical scanner package may further include anti-reflective coating films formed of $MgF_2$ or $SiO_2$ respectively formed on the first, second, and fourth light-transmissive surfaces.

In the optical scanner package in the disclosed embodiments of the present invention, the path of a scanned beam traveling to the screen unit S and the path of a noise beam derived from an incident beam are separated, and thus noise in a realized image can be reduced.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS

Figure 1:
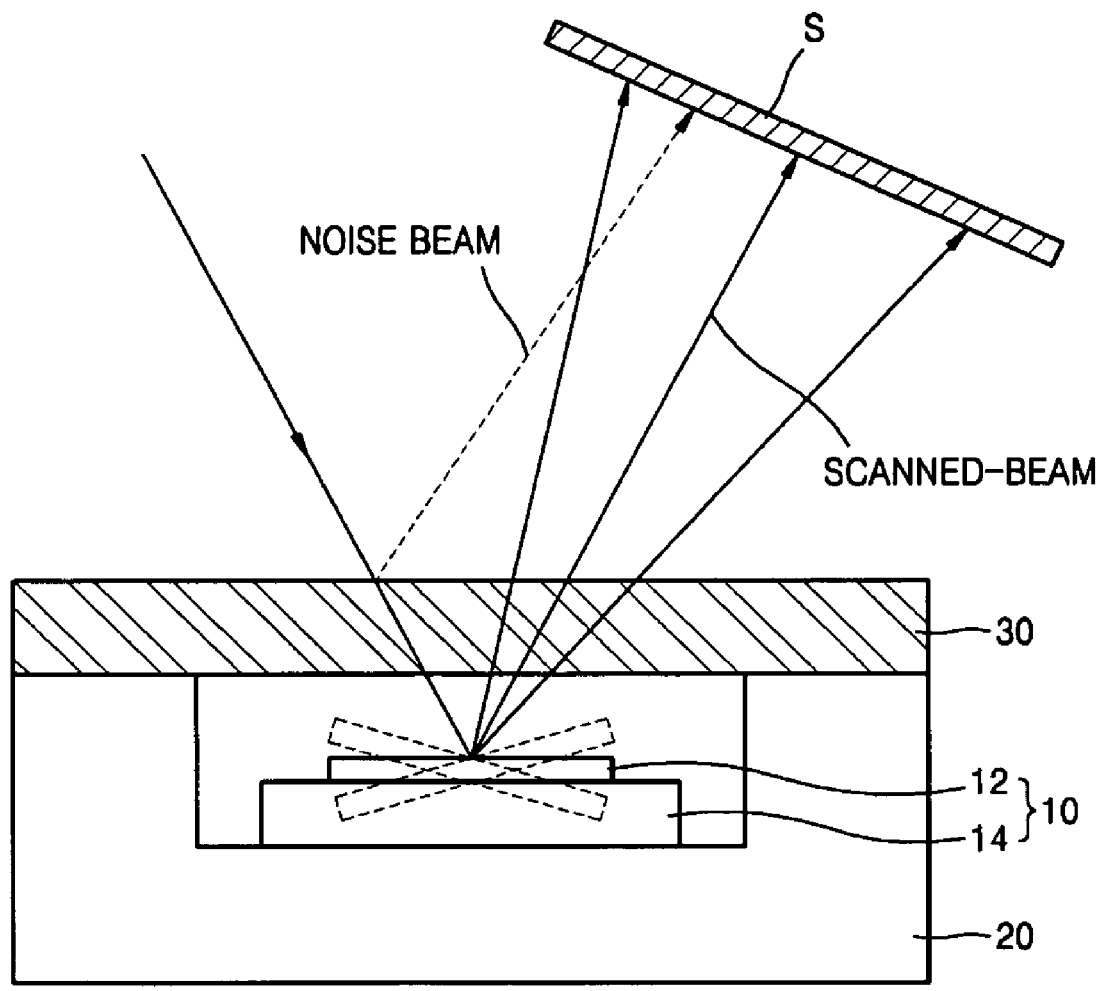
FIG. 1 is a schematic cross-sectional view of a conventional optical scanner package.
Figure 2:
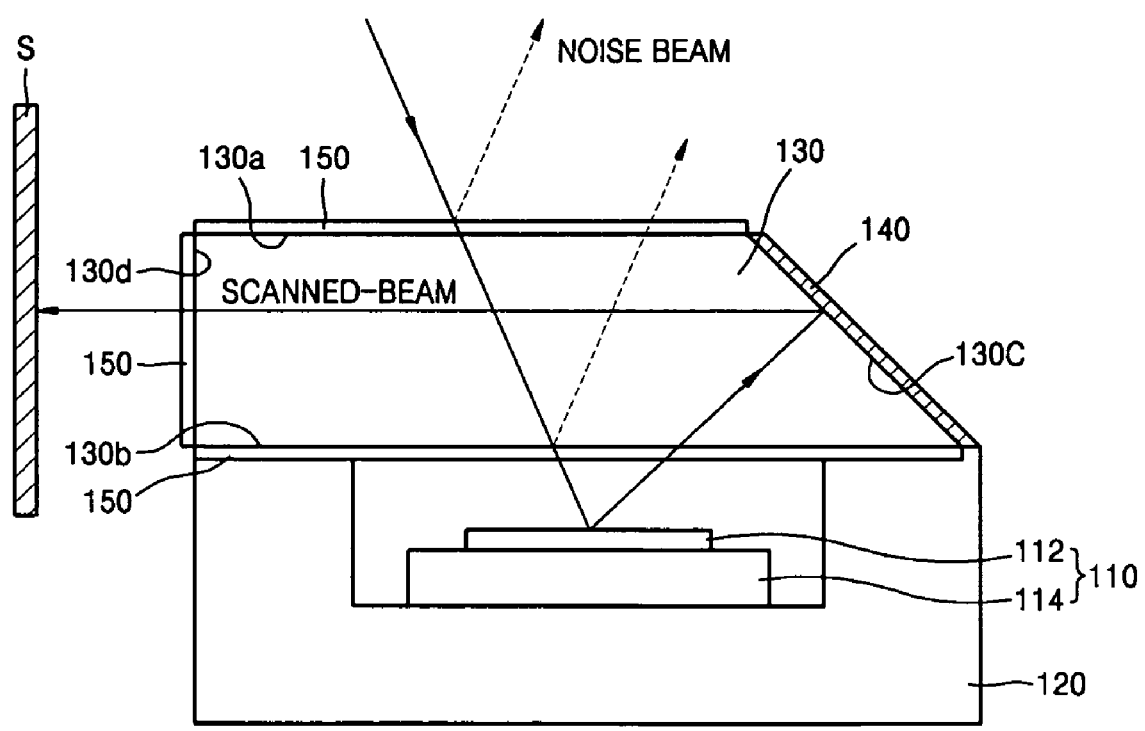
FIG. 2 is a schematic cross-sectional view of an optical scanner package according to a first embodiment of the present invention.

FIG. 2 is a schematic cross-sectional view of an optical scanner package according to a first embodiment of the present invention. Referring to FIG. 2, the optical scanner package according to the first embodiment of the present invention includes an optical scanner device 110, a package container 120 containing the optical scanner device 110, and a package window 130 hermetically sealing the optical scanner device 110 from external conditions by hermetically sealing the package container 120.

The optical scanner device 110 includes a scanning mirror 112 and a comb-type electrode 114 operating the scanning mirror 112, and thus realizes an image on a screen unit S by scanning an incident beam using an electric source. In detail, the package window 130 includes first and second light-transmissive surfaces 130a and 130b on which the incident beam transmitted to the optical scanner device 110 is sequentially incident, a third light-transmissive surface 130c on which a reflection mirror 140 is formed, and a fourth light-transmissive surface 130d to which a scanned beam reflected by the reflection mirror 140 and traveling to the screen unit S is transmitted. A vertical cross-section of the package window 130 forms an asymmetric trapezoid. The package window 130 is formed of a light-transmissive material, and the reflection mirror 140 is formed of a light-reflective material such as Ag, Al, or Au and coated on the third light-transmissive surface 130c.

In the optical scanner package of the present embodiment, an incident beam is sequentially transmitted to the first and second light-transmissive surfaces 130a and 130b of the package window 130, reaches the optical scanner device 110, and is scanned by the optical scanner device 110. A scanned beam from the optical scanner device is sequentially transmitted to the second and third light-transmissive surfaces 130b and 130c and reaches the reflection mirror 140. The scanned beam is reflected from the reflection mirror 140 to the fourth light-transmissive surface 130d, and then travels to the screen unit S. Accordingly, the path of the scanned beam traveling to the screen unit S is separated from the path of a noise beam, which is derived from the incident beam on the surface of the package window 130, and thus noise in a realized image can be reduced.

A highly reflective coating film formed of a transparent dielectric material such as $TiO_2$, $Ta_2O_5$, or $SiO_2$ may be formed on the reflection mirror 140. In addition, an anti-reflective coating film 150 formed of a material such as $MgF_2$ or $SiO_2$ can be further formed on the first, second, and fourth light-transmissive surfaces 130a, 130b, and 130d.

Figure 3:
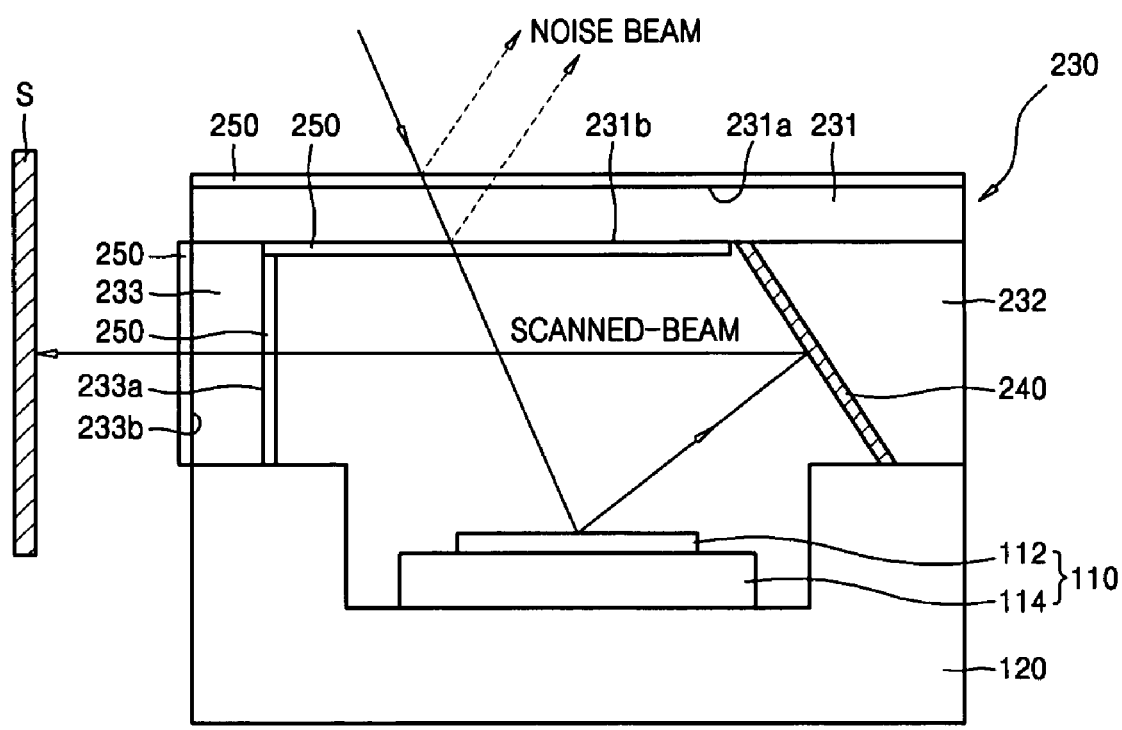
FIG. 3 is a schematic cross-sectional view of an optical scanner package according to a second embodiment of the present invention.

FIG. 3 is a schematic cross-sectional view of an optical scanner package according to a second embodiment of the present invention. The description of elements common to both of the first and second embodiments will not be repeated. Like reference numerals denote like elements.

The second embodiment of the present invention includes a package window 230 modified from the package window 130. That is, the package window 230 of the second embodiment of the present invention includes a reflection mirror 240 reflecting a scanned beam transmitted from the optical scanner device 110 to the screen unit S as in the first embodiment, but has a different structure. In detail, the package window 230 includes a first window 231 disposed on the package container 120, facing the package container 120 and having first and second light-transmissive surfaces 231a and 231b through which an incident beam is transmitted to the optical scanner device 110; a second window 232 that is installed on a side wall of the package container 120 to support one side of the first window 231 and has a vertical cross-section that forms an inverted asymmetric trapezoid, a reflection mirror 240 formed on one side of the second window 232; and a third window 233 that is installed on the other side wall of the package container 120 to support the other side of the first window 231 and includes a third and fourth light-transmissive surfaces 233a and 233b through which a scanned beam reflected by the reflection mirror 240 and traveling to the screen unit S is sequentially transmitted.

In the present embodiment, an incident beam is sequentially transmitted through the first and second light-transmissive surfaces 231a and 231b of the first window 231 to reach the optical scanner device 110, and is scanned by the optical scanner 110. The scanned beam from the optical scanner device 110 reaches the reflection mirror 240 formed on one side of the second window 232. Also, the scanned beam is reflected from the reflection mirror 240 to the third and fourth light-transmissive surfaces 233a and 233b and travels to the screen unit S. Accordingly, the path of the scanned beam traveling to the screen unit S is separated from the path of a noise beam derived from the incident beam, and thus noise in a realized image can be reduced.

A highly reflective coating film formed of a transparent dielectric material such as $TiO_2$, $Ta_2O_5$, or $SiO_2$ may be further formed on the reflection mirror 240. In addition, an anti-reflective coating film 250 formed of a material such as $MgF_2$ or $SiO_2$ can be further formed on the first, second, third, and fourth light-transmissive surfaces 231a, 231b, 233a and 233d.

Figure 4:
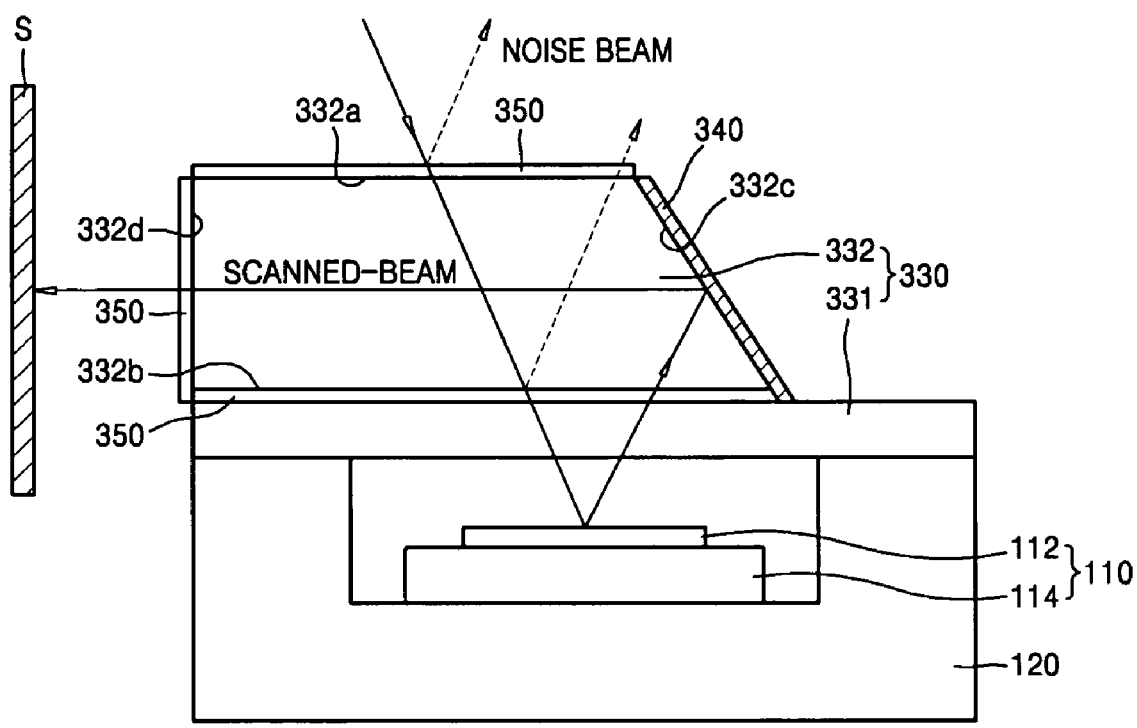
FIG. 4 is a schematic cross-sectional view of an optical scanner package according to a third embodiment of the present invention.

FIG. 4 is a schematic cross-sectional view of an optical scanner package according to a third embodiment of the present invention. The description of elements common to both of the first and third embodiments will not be repeated. Like reference numerals denote like elements.

The third embodiment of the present invention includes a package window 330 modified from the package window 130. That is, the package window 330 of the third embodiment of the present invention includes a reflection mirror 340 reflecting a scanned beam transmitted from the optical scanner device 110 to the screen unit S as in the first embodiment, but has a different structure than the package window 130 of the first embodiment. In detail, the package window 330 of the third embodiment includes a first window 331 hermetically sealing the package container 120 and a second window 332 installed on the first window 331. The second window 332 includes first and second light-transmissive surfaces 332a and 332b through which an incident beam is sequentially transmitted, a third optical surface 332c on which the reflection mirror 340 is formed, and a fourth optical surface 332d through which a scanned beam reflected by the reflection mirror 340 and traveling to the screen unit S is transmitted. The vertical cross section of the second window 332 forms an asymmetric trapezoid.

In the present embodiment, an incident beam transmits through the first and second light-transmissive surfaces 332a and 332b of the second window 332 to reach the optical scanner device 110, and is scanned by the optical scanner device 110. The scanned beam from the optical scanner device 110 transmits to the first window 331 and the second and third light-transmissive surfaces 332b and 332c to reach the reflection mirror 340. Also, the scanned beam is reflected from the reflection mirror 340 to the fourth light-transmissive surface 332d and travels to the screen unit S. Accordingly, the path of the scanned beam traveling to the screen unit S and the path of the noise beam derived from the incident beam are separated, and thus noise in a realized image can be reduced.

The first and second windows 332 can be bonded with UV glue, and the first and second window 331 and 332 can be formed as a single body. A highly reflective coating film formed of a transparent dielectric material such as $TiO_2$, $Ta_2O_5$, or $SiO_2$ may be further formed on the reflection mirror 340. In addition, an anti-reflective coating film 350 formed of $MgF_2$ or $SiO_2$ can be further formed on the first, second, and fourth light-transmissive surfaces 332a, 332b, and 332d.

Figure 5:
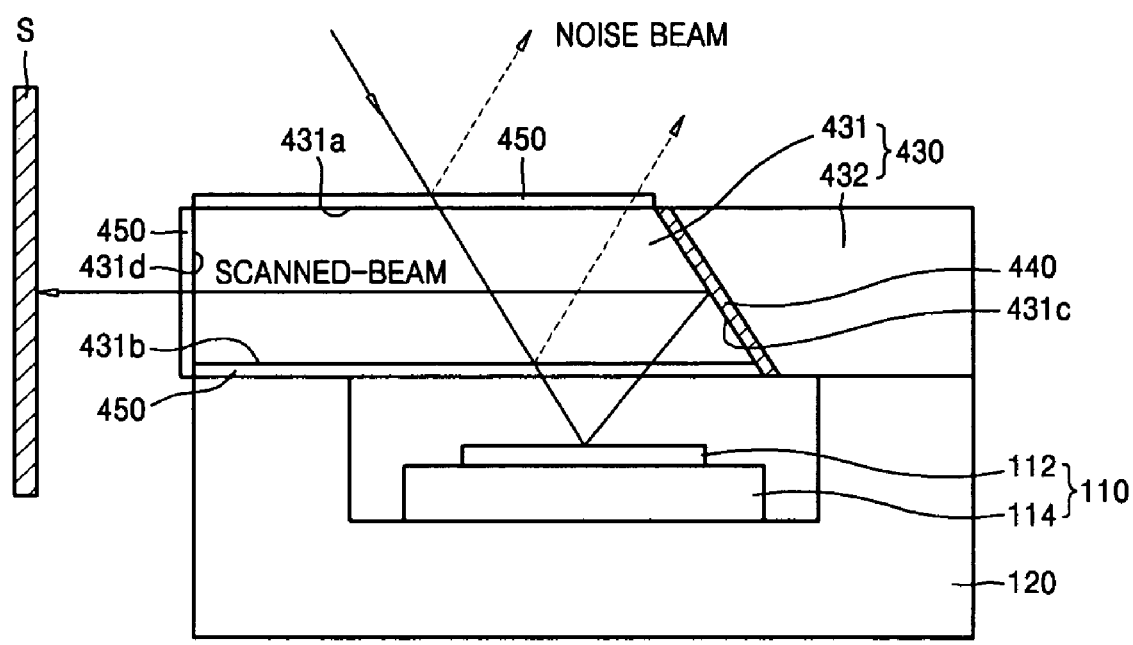
FIG. 5 is a schematic cross-sectional view of an optical scanner package according to a fourth embodiment of the present invention.

FIG. 5 is a schematic cross-sectional view of an optical scanner package according to a fourth embodiment of the present invention. The description of elements common to both of the first and fourth embodiments will not be repeated. Like reference numerals denote like elements.

The fourth embodiment of the present invention includes a package window 430 modified from the package window 130. That is, the package window 430 of the fourth embodiment of the present invention includes a reflection mirror 440 reflecting a scanned beam transmitted from the optical scanner device 110 to the screen unit S as in the first embodiment, but has a different structure than the package window 130 of the first embodiment. In detail, the package window 430 of the fourth embodiment includes a first window 431 and a second window 432 extending from one side of the first window 431, and a reflection mirror 440 interposed between the first and second windows 431 and 432. The first window 431 includes first and second light-transmissive surfaces 431a and 431b through which an incident beam is sequentially transmitted, a third optical surface 431c on which the reflection mirror 440 is formed, and a fourth optical surface 431d through which a scanned beam reflected from the reflection mirror 440 to the screen unit S is transmitted. The vertical cross-section of the second window 432 forms an asymmetric trapezoid, and the second window 432 is bonded on the reflection mirror 440 with UV glue.

In the present embodiment of the optical scanner package, an incident beam is sequentially transmitted through the first and second light-transmissive surfaces 431a and 431b of the second window 430 to reach the optical scanner device 110, and is scanned by the optical scanner device 110. The scanned beam from the optical scanner device 110 is sequentially transmitted to the second and third light-transmissive surfaces 431b and 431c to reach the reflection mirror 440. The scanned beam is reflected from the reflection mirror 440 to the fourth light-transmissive surface 431d and travels to the screen unit S. Accordingly, the path of the scanned beam traveling to the screen unit S and the path of a noise beam derived from the incident beam on the surface of the package window 430 are separated, and thus noise in a realized image can be reduced.

A highly reflective coating film formed of a transparent dielectric material such as $TiO_2$, $Ta_2O_5$, or $SiO_2$ may be further formed on the reflection mirror 440. In addition, an anti-reflective coating film 450 formed of $MgF_2$ or $SiO_2$ can be further formed on the first, second, and fourth light-transmissive surfaces 431a, 431b, and 431d.

According to the present disclosure, in an improved optical scanner package, the path of a scanned beam traveling to the screen unit S and the path of a noise beam derived from an incident beam are separated, and thus noise in a realized image can be reduced. Accordingly, in the present disclosure, luminescence and a contrast ratio can be improved. Also, such optical scanner packages can be packaged on a chip scale, and can thus be smaller in size. In addition, the packaging process can be simplified and manufacturing costs can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical scanner package comprising:
    an optical scanner device scanning an incident beam and including a scanning mirror;
    a package container containing the optical scanner device; and
    a package window that is formed on the package container to hermetically seal the package container, and includes a reflection mirror which reflects the scanned beam from the optical scanner device to a screen unit on one side and is arranged to separate the path of the scanned beam from the path of a noise beam derived from the incident beam and created by partial reflection of the incident beam from an outer surface of the package window.

2. The optical scanner package of claim 1, wherein the package window is formed of a light-transmissive material.

3. The optical scanner package of claim 2, wherein the reflection mirror is coated with a light-reflective material.

4. The optical scanner package of claim 3, wherein the light-reflective material is selected from the group consisting of Ag, Al, and Au.

5. The optical scanner package of claim 2, wherein the package window comprises first and second light-transmissive surfaces through which an incident beam transmitted to the optical scanner device is sequentially transmitted, a third light-transmissive surface on which the reflection mirror is formed, and a fourth light-transmissive surface through which the scanned beam reflected from the reflection mirror to the screen unit is transmitted.

6. The optical scanner package of claim 5, wherein the vertical cross section of the package window form an asymmetric trapezoid.

7. The optical scanner package of claim 5, further comprising a highly reflective coating film formed of a transparent dielectric material on the reflection mirror.

8. The optical scanner package of claim 7, wherein the transparent dielectric material is one selected from the group consisting of $TiO_2$, $Ta_2O_5$, and $SiO_2$.

9. The optical scanner package of claim 5, further comprising an anti-reflective coating films formed on the first, second, and fourth light-transmissive surfaces, respectively.

10. The optical scanner package of claim 9, wherein the anti-reflective coating film is formed of one of $MgF_2$ or $SiO_2$.

11. The optical scanner package of claim 2, the package window comprises:
    a first window that is disposed on and faces the package container and includes a first and second light-transmissive surfaces through which an incident beam transmitted to the optical scanner device is sequentially transmitted;
    a second window that is installed on a side wall of the package container, supports one end of the first window and has a vertical cross-section forming an inverted trapezoid;
    a reflection mirror formed on one side of the second window; and
    a third window that is installed on the other side wall of the package container, supports the other end of the first window and includes third and fourth light-transmissive surfaces through which a scanned beam reflected from the reflection mirror to the screen unit is sequentially transmitted.

12. The optical scanner package of claim 11, further comprising a highly reflective coating film formed of a transparent dielectric material on the reflection mirror.

13. The optical scanner package of claim 12, wherein the transparent dielectric material is selected from the group consisting of $TiO_2$, $Ta_2O_5$, and $SiO_2$.

14. The optical scanner package of claim 11, further comprising anti-reflective coating films respectively formed on the first, second, third and fourth light-transmissive surfaces.

15. The optical scanner package of claim 14, wherein the anti-reflective coating film is formed of $MgF_2$ or $SiO_2$.

16. The optical scanner package of claim 2, wherein the package window comprises:
- a first window hermetically sealing the package container; and
- a second window including first and second light-transmissive surfaces installed on the first window and through which an incident beam transmitted to the optical scanner device is sequentially transmitted, a third light-transmissive surface on which the reflection mirror is formed and a fourth light-transmissive surface through which a scanned beam reflected from the reflection mirror to the screen unit is transmitted.

17. The optical scanner package of claim 16, wherein the vertical cross-section of the second window forms an asymmetric trapezoid.

18. The optical scanner package of claim 16 further comprising a highly reflective coating film formed of a transparent dielectric material on the reflection mirror.

19. The optical scanner package of claim 18, wherein the transparent dielectric material is selected from the group consisting of $TiO_2$, $Ta_2O_5$, and $SiO_2$.

20. The optical scanner package of claim 16, further comprising anti-reflective coating films respectively formed on the first, second, and fourth light-transmissive surfaces.

21. The optical scanner package of claim 20, wherein the anti-reflective coating film is formed of $MgF_2$ or $SiO_2$.

22. The optical scanner package of claim 16, wherein the first and second windows are bonded with UV glue.

23. The optical scanner package of claim 16, wherein the first and second windows form a single body.

24. The optical scanner package of claim 2, the package window comprising:
- a first window including first and second light-transmissive surfaces through which an incident beam transmitted to the optical scanner device is sequentially transmitted, a third light-transmissive surface on which the reflection mirror is formed, and a fourth light-transmissive surface through which the scanned beam reflected from the reflection mirror to the screen unit is transmitted; and
- a second window having one surface contacts the reflection mirror and having one vertical cross-section forming an inverted trapezoid.

25. The optical scanner package of claim 24, wherein the vertical cross section of the first window forms an inverted asymmetric trapezoid.

26. The optical scanner package of 24, wherein the reflection mirror and the second window are bonded with UV glue.

27. The optical scanner package of claim 24, further comprising a high reflection coating film formed of a transparent dielectric material on the reflection mirror.

28. The optical scanner package of claim 27, wherein the transparent dielectric material is selected from the group consisting of $TiO_2$, $Ta_2O_5$, and $SiO_2$.

29. The optical scanner package of claim 24, further comprising anti-reflective coating films respectively formed on the first, second, and fourth light-transmissive surfaces.

30. The optical scanner package of claim 29, wherein the anti-reflective coating film is formed of $MgF_2$ or $SiO_2$.

31. The optical scanner package of claim 1, further comprising a comb-electrode structure operating the scanning mirror.

\* \* \* \* \*